UNITED STATES PATENT OFFICE.

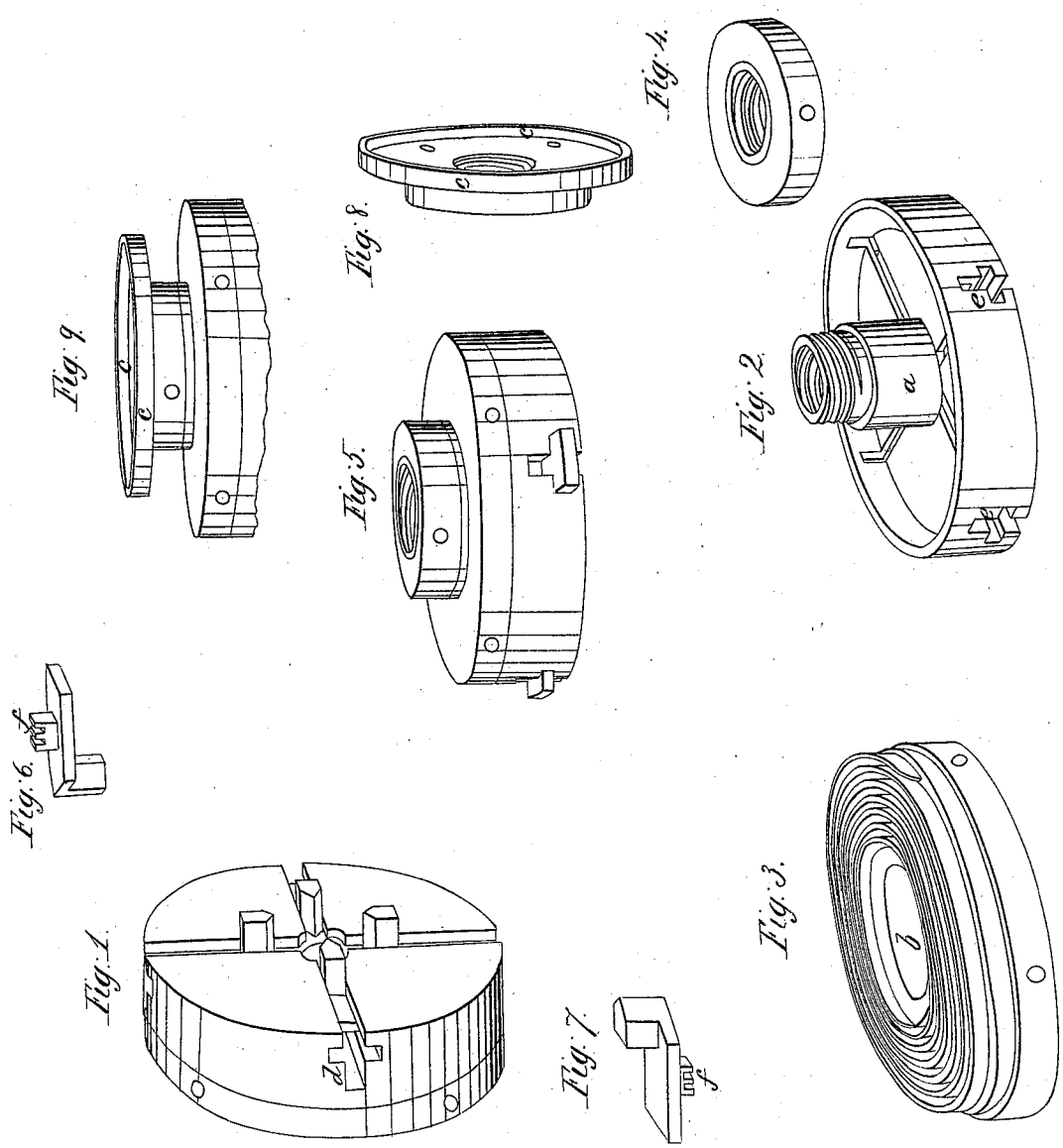

SIMON FAIRMAN, OF WATERFORD, NEW YORK.

EXPANDING AND CONTRACTING OR UNIVERSAL CHUCK FOR LATHES.

Specification of Letters Patent No. 1,692, dated July 18, 1840.

*To all whom it may concern:*

Be it known that I, SIMON FAIRMAN, of the village of Waterford, in the county of Saratoga and State of New York, have invented new and useful Improvements in Machines for Expanding or Contracting the Circular Dimensions of Chucks to Lathes, Pulleys, and other Revolving Bodies; and I do hereby declare that the following is a full and exact description.

The practical effect of the machine upon which my improvements are made, as applied to chucks to lathes, is to adapt them, in respect to size, to such articles as are subjected to the process of turning, and furnish an improved method of obtaining a center to the same as well as for securing them in the lathe for the purpose of being turned. Its application to pulleys is for the purpose of increasing or reducing the temper of their bands or for varying the speed of the band by applying the machine to the pulley which gives it motion or by a like application to that which receives motion from it, for rendering its revolution, under the same speed of band, more or less frequent or powerful.

The machine is represented in Figure 1 of the annexed drawings. It consists of two circular plates, which, for the purpose of description, I distinguish as front and back plates. The front is the face plate, as presented in Fig. 1, and is separately shown with its rim and inner surface up in Fig. 2 and the back plate in Fig. 3. These are matched and fitted to each other so as, when together, to allow one plate to turn either way upon the other in the direction of its circle.

In order to hold the plates together and at the same time provide an opening through the center, for the purpose of fixing the entire apparatus upon the mandrel of a lathe, or of allowing it to revolve with or upon a shaft, according to the use to which it is applied may require, a cylindrical tube is raised from the same inner surface of the front plate at the center, or so as to surround the center, as shown at *a* Fig. 2, and of such form and size as that the passage through the tube shall constitute the central opening for the above purposes, and by extending this tube through the opening provided for it in the back plate (as represented at *b*, Fig. 3) far enough to receive a nut upon the end and outside of the plate common screw threads being cut in each for that purpose, the plates are thereby held together. The nut is also provided with an opening of the same dimensions as that of the tube. One of this description is shown in Fig. 4, and Fig. 5 represents the plates as held together by it.

Or as a different method of fastening the apparatus, as a chuck, to a lathe, for instance, or to other machinery, when the appendages or fixtures are calculated for it, I provide a nut of the form represented in Fig. 8, and also in Fig. 9, as in connection with the back plate when holding the two plates together, as in the case above described. This nut as shown in the drawings referred to is provided with a flange at its outer end termination extending back in the direction of the length of the nut so as to receive within its circle the plate upon the mandrel known by mechanics as the face plate, they being fitted in form and dimensions to each other. And in case the face plate is larger than the size required for the nut as such and without this provision I extend or enlarge the circle of its outer section so that the flange raised from its circumference as shown by the extended section in form of a circular plate upon the end of the nut, at C, C, Figs. 8 and 9, will overreach and snugly fit on to the face plate. This is to preserve the central position of the nut and machine to which it appertains. It is secured to the face plate by any discretionary number of screw bolts, with nuts on the back side of the plate. I use either of the above modes of fastening at my option.

Now in order to produce the expanding and contracting operation, in addition to what has been above described, as preparatory thereto I make provision in the front plate for any discretionary number of slides—not less than three—to be made movable to or from the center of the plate, in the direction of the radii of its circle. These I arrange at equal distances from each other—making the passages for them about centrally—in respect to the thickness of the plate, between its inner and outer surface. The entrance to one of which is shown at *d*, Fig. 1, and also at *e, e*, Fig. 2, and in Fig. 5, where small projections are seen of the outer end of the slides. To these passages the slides are respectively fitted, so as to pass easily and snugly within them. From the outer surface of the flat plate of each side, as distinguished from its appendages, an arm or projection is extended out through a groove or opening provided for it in the front plate—four of which openings are shown in Fig. 1, extending in length from the circumference to the center. These projections constitute the holders of the chuck, and whatever number of slides are provided for one machine are all equidistant from the center, and by the operation of the machine are made to move to or from the center simultaneously. And when fixed at any intermediate point and carried around by the revolution of the machine, they all describe one and the same circle. They are shown extended through the grooves in the face of the front plate in Fig. 1, and in connection with the flat plate of the slide to which they belong, in Figs. 6 and 7. From the opposite flat surface of the same plate of the slide, as shown at $f$, projections are also provided, terminating in any discretionary number of teeth or cogs, which in their thickness and length, are fitted to an eccentric groove, formed by a coiled flange from the inner surface of the back plate, as represented uppermost in Fig. 3. This flange is so raised and is of such form and dimensions as that, when the back and front plates are put together, its convolutions will pass in between the cogs of each slide. This convolved or coiled form gives to it one continuous line—commencing near the opening at the center of the plate and extending outward in a regular eccentric curve to the circumference—preserving, at each preceding convolution and at every part thereof, one uniform distance from the last, thereby leaving the intervening space as one continuous winding groove, advancing by the same graduated inclination either in or out according to the direction in which it is traced. The obvious effect of which is, that by turning one of the circular plates either way upon the other the flange, in its bearing against the cogs of the slides, upon the principles of a cam forces each slide along its passage across the plate one way or the other accordingly. The passages are extended quite through the periphery of the plate for the purpose of introducing or taking out the slides, as well as to provide for their outward extension, when in use, as far as the connection of the cogs with the coiled flange will allow. And as the passages necessarily separate the plates as far as they go, a rim is raised as a flange from its edge, for the purpose of strengthening it at its circumference extending back to any discretionary distance beyond the depth of the passages at their entrance through the same.

The form and dimensions of the slides and of the passages for them of course, as also the projections from their outer surface, being matters of judgment, I may at discretion—having regard to the special use and purpose for which the machine is intended as to which the holders are to be applied—and in all cases I provide that the plates of the slides shall be of sufficient width to extend as wings on each side beyond their projections into the lateral grooves provided for them between the inner and outer surface of the front plate for the purpose of giving steadiness and firmness to their movement and practical operation.

I do not claim to be the inventor of the above described mode of working the holders by means of the convolute grooves, but What I do claim as my invention and desire to secure by Letters Patent is—

1. The method of securing together the front and back plates by means of the tubes and nut, by which I am enabled to attach the front plate directly to the mandrel or face plate of the latter all as above described, in like manner.

2. I do not claim as my invention the rim on the front plate, but what I do claim as my invention is providing the rim with apertures through which the slides or holders can pass for the purpose and in the manner above described.

Subscribed this 30th day of June 1840.

SIMON FAIRMAN.

Witnesses:
 DANIEL WHITING,
 ANDREW FOLLET.